ARRANGEMENT FOR SETTING MAGNETIC CIRCUITS

Filed June 12, 1958 2 Sheets-Sheet 1

JOSEF DIRR
INVENTOR
BY
Leon M. Strauss
Att.

JOSEF DIRR
INVENTOR
BY Leon M. Straus
Agt

United States Patent Office 3,020,536
Patented Feb. 6, 1962

3,020,536
ARRANGEMENT FOR SETTING MAGNETIC CIRCUITS

Josef Dirr, Fohrenweg 10, Solothurn, Switzerland
Filed June 12, 1958, Ser. No. 741,669
5 Claims. (Cl. 340—364)

The present invention refers to an arrangement for setting magnetic circuits such as may be used in all branches of automatization, with telephone and teletype installations, with computing machines and for the control of machines. The present invention solves the problem of feeding a plurality of magnetic circuits selectively and in any succession by means of a field generator only.

It is the object of the invention to reduce the number of switching means, and, in the case of relay switching, the number of relays.

Conventional multiple switches use single magnets, such as bar magnets, for making the outputs, and also single magnets, such as bridge magnets, for connecting through and for maintaining the actual connection. The bridge magnets were continually current-carrying as long as the connection existed. Switches of that type therefore required a great number of magnets. Moreover there was a considerable consumption of current during the periods of connection. Furthermore, for avoiding double connections in multiple switches only one bridge magnet may be used for a through-connection at a time. This was guaranteed by means of chain connections, which again required a considerable amount of switching means.

Furthermore there are conventional arrangements for multiple switches wherein simultaneous marking of a determined number of bridge bars is effected by means of a bar magnet on a magnetic base. The iron circuits of such bar magnets are formed in such a way that an individual armature is provided for each bridge bar to be marked. When switching the bar magnet on, all armatures are then attracted simultaneously.

According to the present invention the disadvantage inherent in the great number of members used in arrangements requiring a plurality of magnetic circuits selectively in any succession, is avoided by providing only one field generator, switching means consisting of magnetic material, provided with straight or rotary movement being arranged in the iron path so that selectively one or a plurality of magnetic circuits is/are closed through one or a plurality of predetermined positions. As a switching means consisting of magnetic material there may be provided for instance a cam-shaft having devices of magnetic material disposed at predetermined angles and eventually distances, through which in one or in a plurality of predetermined angular positions one magnetic circuit or a plurality of magnetic circuits is/are selectively closed. Furthermore switching means may be provided in the form of rails consisting of non-magnetic material with inserts of magnetic material arranged in such manner that by shifting one or a plurality of such rails in a predetermined combination in one or two directions the inserts of magnetic material are brought into such mutual positions that only one or a plurality of magnetic circuits is/are closed, the number of individual magnetic circuits being determined by the number of possible combinations of the rails.

If the arrangement is designed for replacing a relay, armatures of magnetic material are disposed in the magnetic circuits so that the armature which is arranged in the actually marked circuit will be attracted. The armatures may also be held fast according to the switch principle, especially when used in the place of bridge magnets in multiple switches, mechanical means being actuated after the attraction of the armature and depending thereon, so that the actual armature cannot go back after the magnetic field has been switched off. Hereby the permanent current of the bridge magnets in a multiple switch is also avoided. As only one armature can be attracted at a time, multiple switches do not require chain connections. Unlocking of the armatures may also be operated selectively, another magnetic circuit, a releasing circuit, being provided in such a way that a locking switch means is disposed in the magnetic circuit so that after the marking of the releasing circuit and the switching-on of the magnetic field an attraction moment will work on the locking switch means to bring it back into its starting position. The releasing circuit may therein be led through the setting device, such as a cam, or through a special device.

In the drawings the invention is shown in various types of embodiments by way of example, wherein.

Figure 1:
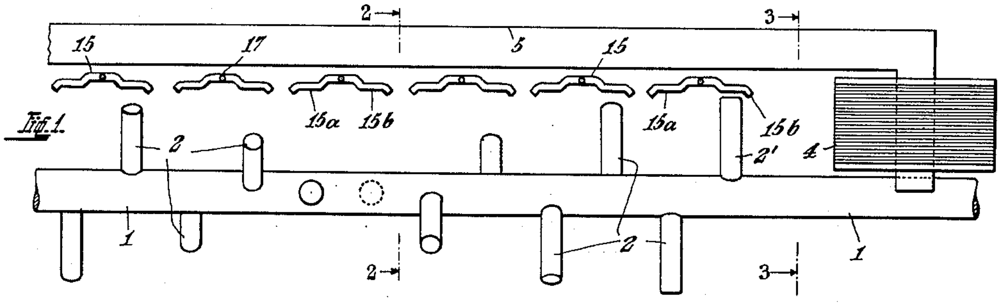
FIG. 1 shows a front view of an embodiment of the invention.
Figure 2:
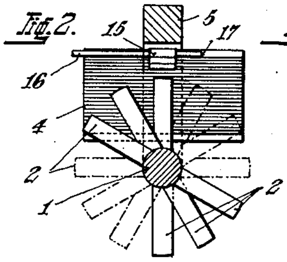
FIG. 2 is a vertical sectional view taken along the line II—II of FIG. 1.
Figure 3:
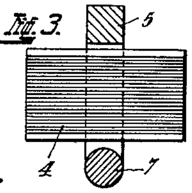
FIG. 3 is a vertical sectional view taken along the line III—III of FIG. 1.

The embodiment of the FIGURES 1, 2, 3 shows the principle of the invention. On the cam-shaft 1 cams 2 are disposed at different angles. There is also provided a rail 5 which is bent off at a right angle on one side and which bears a magnet coil 4. The rail may be made of laminated iron. Below the rail 5 double-armed levers *15a/15b* are arranged, which may be a part of the horizontal bar 16 of a multiple switch. The possibility of pivoting in two directions allows to mark two outputs of the multiple switch by means of one horizontal bar. Thus for each horizontal bar two cam pins 2 are required. All of the above parts of the arrangement are made of magnetically conducting material, such as relay iron.

The number of cams which may be mounted is only limited by the magnetic conditions. The flux passing through the cam following the cam being in working position may not be strong enough to cause the armature associated with the following cam to be attracted. By enlarging the radius of the cams an enlargement of the number of cams may be obtained. For the sake of even movement the cams will be disposed symmetrically on the shaft. The angular distance in such an arrangement is equal to 360 degrees divided by the number of cams.

The operation of said arrangement is as follows: The shaft 1 is driven by a motor, a motor selector drive or a step-by-step switching mechanism. The drive is not shown in the arrangement, such drives being well known and not interfering with the principle of the invention. The control of the drive is operated by means of the arrangement described further below and shown in the FIGURES 14, 15. At each resting position a lever *15a* or *15b* is above the cam that is in its working position. After setting the shaft 1 at a predetermined position the magnet coil 4 is energized. Now the magnetic flux passes through the cam which is in working position, for instance, the cam 2′, and the lever *15b*. The lever *15b* is exposed to a moment of attraction. It is attracted towards cam 2′. Thereby the output associated with cam 2′ is marked. In the multiple switch a bridge bar is now attracted. By this the setting operation is completed. Now the magnet 4 is switched off. The lever *15b* is brought back into its starting position by spring power. The arrangement is now ready for other markings.

In FIG. 2 the horizontal bar is marked at 16 and the pivot at 17.

In the FIGURES 4 to 10 another embodiment of the invention is shown.

A cam-shaft 1 is provided as a common setting member, with cam pins 2 for selectively setting magnetic circuits. With each cam pin 2 an individual bent lever 3 is associated in a fixed position, so that, when the field generator 4 has been switched on, the magnetic flux will only pass through the cam pin 2 and the bent lever 3, which is to be actuated, at a predetermined position of the cam-shaft. The bent lever 3 may be a part of a bridge bar of a cross bar switch. For closing the actual magnetic circuit a common rail 5 is associated with all circuits. In the embodiment according to FIGS. 4 to 10 the selectively actuated bent levers are held fast in the operating position according to the switch principle. This is obtained by means of a pin 6, which upon actuating the bent lever is set free to fall down and thereby prevent the bent lever from reassuming its initial position. For releasing the bent lever two magnetic circuits are provided, i.e. the setting circuit and a further circuit which, on a magnetic base, brings the blocking member back into the starting position. The actual magnetic setting circuit passes through the cam-shaft 1, the rail 5, the projection *5a* individually associated with each bent lever 3, the actual bent lever and the cam pin 2 associated with the actual bent lever.

On the rail 5 the generator of the magnetic field 4 is arranged. After setting a cam pin 2 at a predetermined bent lever the field generator 4 is switched on. Thereby the magnetic flux can only follow the one cross-path. The produced magnetic force will only attract the marked bent lever 3 towards the cam pin 2. Now the blocking pin 6 associated with and supported by that bent lever is free to fall down since the bent lever has been displaced and the bent lever 3 cannot reassume its starting position after the magnetic flux has been switched off. Now the cam-shaft 1 is ready for further markings.

For releasing the bent lever the blocking pin 6 must be brought back into the starting position. As already mentioned, a second magnetic circuit is provided for selectively actuating all blocking pins which circuit passes through the cam-shaft 1, the cam 2, the bent lever 3 marked by the cam, the blocking pin 6, and the rail 7 associated with each of the blocking pins for closing the magnetic circuit. The coil 8 is provided as a field generator for this magnetic circuit. The main flux passes through the bent lever 3 marked by the cam pin 2 and through the blocking pin 6. Only very small leakage fluxes will pass through neighbouring cam pins. For the releasing first of all the magnetic setting circuit is switched on. Thereby the blocking pin 6 is raised to no longer jam the bent lever. The blocking pin is lifted by the magnetic force of the releasing circuit. Then follows the switching-off of the setting circuit to bring the bent lever 3 back into the starting position by means of the spring 9, as said lever serves at the same time as a rest for the blocking pin 6, and finally the releasing magnetic circuit is switched off. The blocking pin 6 is released and falls back on the lever arm *3a* of the bent lever 3.

This arrangement will now be explained in detail. Of course the structural members through which the magnetic circuits pass are made of magnetic material. The cams 2 are in the form of pins having their free end filed on both sides, as may be clearly seen from the FIGURES 4 and 10 with regard to the cam 2, in order to keep the distance respectively from the next cam and bent lever as great as possible with regard to the air gap of the magnetic flux. For the same reason also the bent lever is narrow on the cam side. The bent lever is pivoted at the point 10. The other pivot is not shown. Depending on the release power of the bent lever a distance plate of non-magnetic material may eventually be required for preventing the bent lever from being held fast by residual magnetism. The fixation of the rail and the bearing of the cam-shaft are of non-magnetic material. For the sake of clearness they are not shown in the drawings. After the magnetic flux has been switched off, the bent lever 3 in operating position moves back a little so that no mechanical friction will be produced by the actual cam 2 during further settings. The guide holes for the pins 6 are disposed in a rail 11 of non-magnetic material. For preventing any brake effect during the attraction of the pin 6 members *11a* of magnetic material are provided on the rail 11. They serve at the same time as stops for the bent levers 3.

Figure 4:
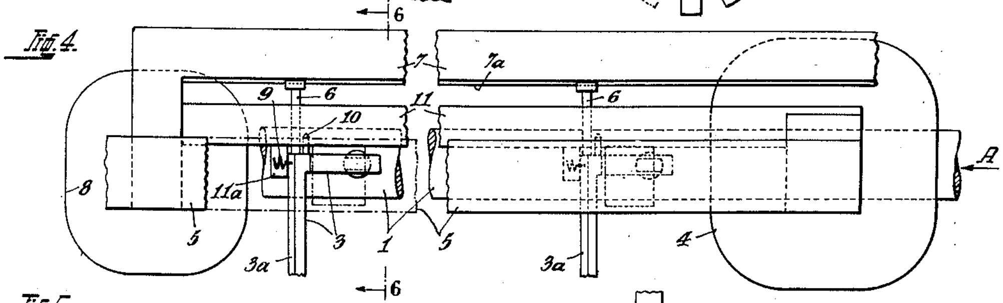
FIG. 4 is a front view of a second type of embodiment of the invention.
Figure 5:
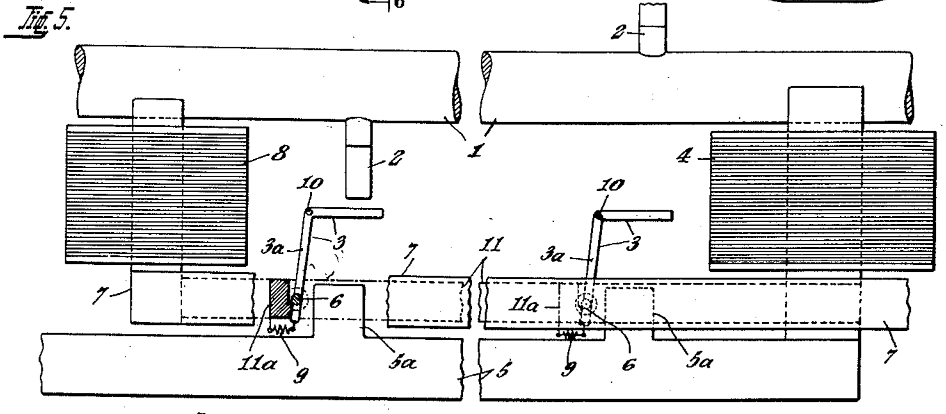
FIG. 5 is a top view of the second embodiment.
Figure 6:
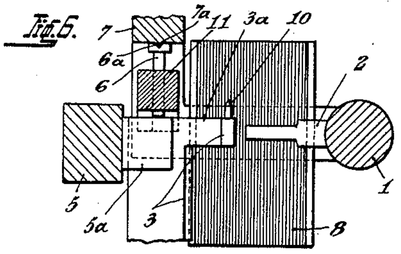
FIG. 6 is a vertical sectional view taken along the line VI—VI of FIG. 4.

FIGURE 6 is a section along the line VI—VI of FIGURE 4 showing the setting arrangement. The pin 6 is shown in its starting position. The cam-shaft is shown at 1, a cam pin at 2, a bent lever at 3, a projection at *5a*, the rail of the setting circuit at 5, the guide rail for the pins at 11, a pin at 6, a slot on the pin 6 at *6a*, and a key on the rail 7 of the release circuit at *7a*. The slot *6a* and the key *7a* serve for obtaining a favourable attraction moment for the pin 6.

Figure 7:
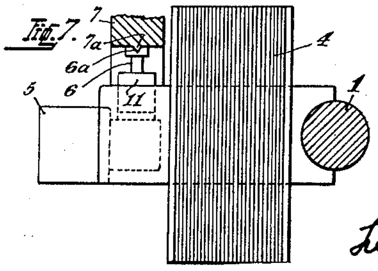
FIG. 7 is a side view corresponding to FIG. 4 and taken in the direction of the arrow A of FIG. 4.

As may be seen from FIG. 7, the core of the coil 4 is somewhat wider than the portion of the rail 5 which is parallel with the cam-shaft, in order to prevent any effect of the release circuit on the magnetic setting circuit.

Figure 8:
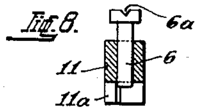
FIG. 8 is a sectional detail view showing the pin guide rail with a stop.
Figure 9:
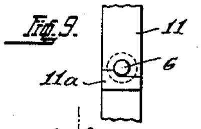
FIG. 9 is a view of the rail from the bottom.

The FIGURES 8 and 9 show the guide rail 11 for the pins in section with the pin 6 and a view from the bottom. The member *11a* of magnetic material serves at the same time as a stop for the bent lever 3 and as a rest for the pin 6.

FIG. 4 is a front view of the common setting arrangement. It shows the pin 6 resting on the arm *3a* of the bent lever. The coil for the production of the magnetic field for the setting circuit is shown at 4, the rail for the setting circuit at 5, the cam-shaft at 1, a cam at 2, a projection at *11a*, a bent lever at 3, a blocking pin at 6, the coil for the production of the magnetic flux for the releasing circuit at 8, the rail for closing the magnetic releasing circuit at 7, and the key for obtaining a favourable attraction moment for the pin 6 represented by the pin 6 at *7a*.

Figure 10:
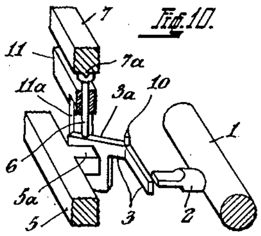
FIG. 10 is an isometric diagrammatical representation of the cross-path of the magnetic flux of the setting and releasing circuits of one type of embodiment.

FIG. 10 shows a portion of the common setting arrangement in a perspective view. The blocking pin 6 is shown uncovered. The pivot 10 of the bent lever 3 is shown without bearing. This figure shows very clearly the operation of the arrangement. The cam-shaft is marked at 1, a cam pin at 2, a bent lever at 3, the pivot of the bent lever at 10, the projection at 5*a*, the rail for the setting circuit at 5, the pin at 6, the magnetic part of the pin guide at 11*a*, the pin guide rail at 11, and the rail for the releasing magnetic circuit at 7.

Figure 12:
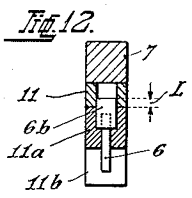
FIG. 12 is a cross section of the pin guide rail with stop of this other embodiment.
Figure 13:
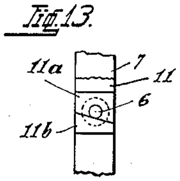
FIG. 13 is a view of the rail from the bottom of this other embodiment.

FIGURES 12 and 13 show a special embodiment of the release cross-path for the magnetic flux. In this arrangement the pin 6 is made of non-magnetic material, while the head 6*b* of the pin is of magnetic material. In the blocking position the head 6*b* of the pin projects over a distance L beyond the magnetic part 11*a* so that the main magnetic flux will go through the head 6*b* to the rail 7. By this arrangement the braking effect during the attraction of the pin 6 is substantially avoided. The bottom end of the part 11*a* serves at the same time as a rest for the pin, so that no bending strain will arise.

Figure 11:
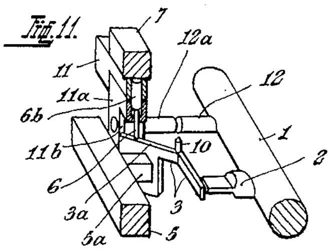
FIG. 11 is an isometric diagrammatical representation of the cross-paths of the magnetic flux of the setting and releasing circuits of another type of embodiment.

FIG. 11 shows an arrangement for a common setting member on a magnetic base, in which the bent levers 3 are held fast according to the switch principle after the marking, but in which the cross-paths of the magnetic fluxes for the setting and releasing operations are separate. For each setting circuit an individual setting cam 2, and for each releasing circuit an individual releasing cam, such as 12, are provided. The operation of the actual bent lever 3 by a determined cam at a determined angular position is obtained by switching the magnetic setting circuit on after stopping of the cam-shaft, in accordance with the arrangement of FIG. 5. However the locking pin 6 is of non-magnetic material and also the resting piece 11*c* for the locking pin, which piece serves as well as a stop for the bent lever 3, is of non-magnetic material, so that a mutual interference of both magnetic circuits does not occur. The head 6*b* of the pin 6 is of magnetic material. In the case of blocking it projects so far from the magnetic part 11*a* that all of the magnetic flux towards the rail 7 passes through the head 6*b* of the pin 6, if one neglects the insignificant leakage fluxes. The rail of the releasing circuit is marked at 7. The member 11 is non-magnetic and serves merely for fixation. The counterpiece 12*a* for the release cam pin 12 is also of magnetic material. For the release the first step consists, as with the arrangement of FIG. 5, in setting the setting circuit for avoiding friction on the pin 6, whereupon the releasing circuit is switched on. After the pin has been attracted the setting circuit and then the releasing circuit are switched off. In the present case the setting and releasing cams are in the same plane, which however is not a requirement.

With the arrangements so far described it is also possible to simultaneously set a plurality of setting circuits, eventually in a predetermined combination, and to attract bent levers. In this case, during the state of attraction the air gaps must be still wide enough for excluding magnetic short-circuiting by the first attracting armature lever. Of course one may also provide a plurality of field generators and form different magnetic circuits with cross-paths which may be selectively set and set them in different combinations.

Figure 14:
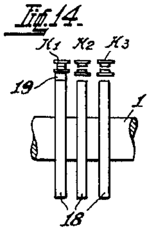
FIG. 14 shows another example of embodiment for the marking on the common setting member.
Figure 15:
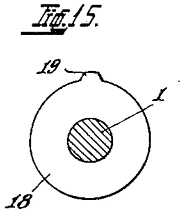
FIG. 15 shows a cam disk in front view.

FIGURES 14 and 15 show embodiments for marking the positions on the common setting member by employing a cam-shaft with cam pins for selectively actuating the bent levers, respectively the levers of the described figures.

FIG. 14 shows the constructive arrangement. On the cam-shaft 1 the cam disks 18 with angularly displaced cams 19 are disposed. By these cams the contacts K1, K2, K3 are successively actuated.

Figure 16:
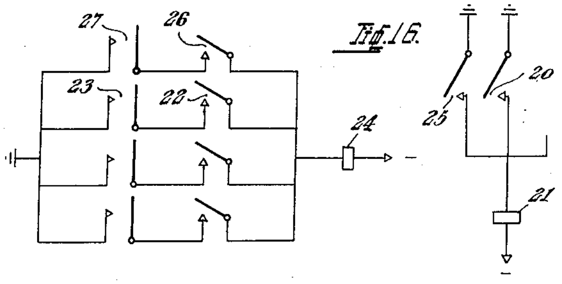
FIG. 16 is a diagram of connections for characterizing the marking positions on the cam-shaft.

FIG. 16 shows the switching arrangement for characterizing the marking positions on the cam-shaft. For instance, for marking the bent lever 3 of FIG. 5 the starting relay 21 is switched on through the switch 20, whereby the cam-shaft 1 is actuated. Simultaneously the contact 22, which is individually associated with the bent lever 3, is closed. Now the cam-shaft 1 will move until through the cam contact 23, which characterized the marking position of the cam pin 2 associated with the bent lever 3, a circuit for actuating the stopping relay 24 is formed. By the relay 24 the cam-shaft is stopped. Then, by switching the setting circuit on, the marking respectively the attraction of the bent lever is effected. In the switching example two different positions on the cam-shaft are provided for the setting and for the release. Through 25 the starting relay 21 is again switched on, and through 21 the cam-shaft is started to work. Simultaneously the release marking contact 26 associated with the bent lever 3 is closed. The relay 24 responds on closing the cam contact 27 and stops the cam-shaft. In this stopping position of the cam-shaft the bent lever 3 is brought back into its starting position. In FIGURES 4 to 10 only one position is provided on the cam-shaft for the actual setting and release, while in FIG. 11 two marking positions are required.

Figure 18:
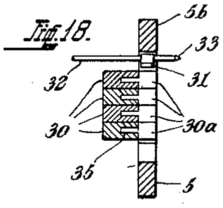
FIG. 18 shows a cross section of this rail arrangement.
Figure 17:
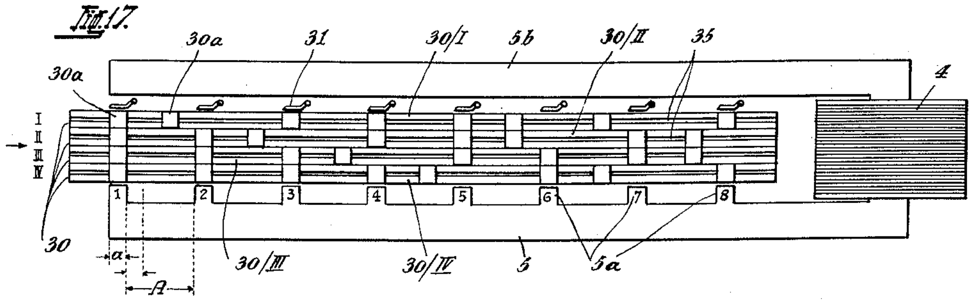
FIG. 17 shows an arrangement wherein the setting of the magnetic circuits is operated by rails.

FIG. 17 shows an arrangement according to the invention, wherein selective setting of the magnetic circuits is operated with four rails 30/I, 30/II, 30/III, 30/IV. The marking of the circuits is operated following the combination principle. With four rails 30 it is possible to mark 16 magnetic circuits. The rails are made of non-magnetic material. They are provided, correspondingly, for instance, with the selecting rails of telewriters (see Taschenbuch für Fernmeldetechnik by Goesch, page 82), with recesses 35, wherein parts 30*a* of magnetic material are inserted. A magnetic cross circuit is closed when the iron parts 30*a* of all of the four rails are lying upon each other. The distance between the different cross-paths is great enough to prevent the forming of strong magnetic leakage fluxes through the iron parts to be shifted. In FIG. 17 the distance A between two cross-paths is four times the width *a* of the magnetic parts 30*a*. When shifting in the direction of the arrow, if, for instance, the rail 30/I is actuated, the part 30*a* is shifted by two widths *a* to the right. If now the cross-path 2 is to be closed by shifting the rail 30/I to the right, in the starting positions of the rails the part 30*a* must be displaced by two widths *a* to the left. After the rails have been set at the marking position the magnetic flux is switched on. The circuit for the coil 4 is closed. In the embodiment of FIG. 17 a lever 31 is associated with each crosspath, which lever is arranged in the magnetic circuit so that a turning moment is working on it. The magnetic circuit is closed by the rails 5 and 5*b*, which are of magnetic material. By means of the lever 31 one may, for instance, mark an output of a multiple switch. As shown in FIG. 18, the lever 31 is rigidly connected to the bar 32, which is mounted with the pivot 33 in a bearing, which, for the sake of clearness, is not shown. On attraction the bar 32 performs a rotary movement, whereby marking springs of a multiple switch are stretched. Afterwards the through-connection magnet of the multiple switch is attracted. The magnet 4 is switched off, the lever 31 moves back into its starting position, where it is held fast by spring action. Finally also the rails 30 are brought back into their starting positions.

Operation of the rails 30 may for instance be effected by single magnets. As arrangements for the shifting of rails by means of magnets are already known, especially in telewriters, their construction is not shown in the drawing. The magnets may also be disposed at both ends of the rails. In order to obtain small magnets for the shifting of rails, the latter may be borne on rolls, if horizontal arrangement is possible, so that very small forces are required for operation. Thereby also the release springs may be small power springs. If the rails 30 are arranged vertically, they may for instance be held fast by means of levers, which are actuated by small magnets. In this case the rails will fall down until reaching a predetermined stop. After the marking a cam-shaft provided for a plurality of arrangements will bring the rails back into their starting positions. The lever will snap in and prevent the rails from falling down again.

In FIG. 17 the rails 30 are only shifted to the right for marking. The circuit 2, for instance, is marked by shifting the rail 30/I, the circuit 3 by shifting the rail 30/II, the circuit 6 by shifting the rails 30/I and 30/II. The circuit 1 is already marked in the starting position of the rails, i.e. the magnetic field generator must only be switched on. Marking of two or more cross circuits with the same arrangement is only possible if in the attracted state there exists still a sufficient air gap in order to prevent the first attracting lever from producing a magnetic short-circuit of the other circuits. If the magnetic resistance of the cross-circuits remains invariable, as is for instance the case if only one inductive pulse is required for the marking, the number of the cross circuits to be marked simultaneously may be considerably higher.

Figure 19:
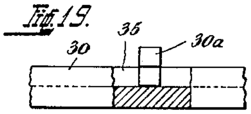
FIG. 19 shows part of a rail with a magnetic insertion member in front view.

If for instance two cross circuits are to be marked simultaneously by the rail 30/I, another circuit corresponding to the cross circuit 2 must be formed which has the same iron inserts as the latter. The cross circuits need not be arranged symmetrically. FIG. 18 shows a section of the arrangement. The inserts are disposed according to FIG. 19. The grooves 35 are milled through. The inserts 30*a* are stepped in correspondence with the grooves.

Figure 20:
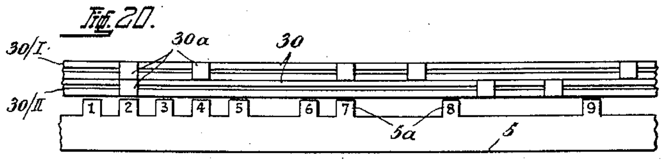
FIG. 20 shows an arrangement with two rails, which are also relatively shifted to set the magnetic circuits.

The marking of cross circuits can also be effected by the combination of rails and directions of shifting. In FIG. 20, 9 cross circuits are marked by means of two rails and two shifting directions. In the starting position there is marked the cross circuit 2. Shifting both rails to the left means marking of the cross circuit 1, shifting both rails to the right means marking of the cross circuit 3, shifting of the rail I to the right means marking of the cross circuit 5. The ninth cross circuit is marked by shifting the rail 30/I to the left and the rail 30/II to the right. In the embodiments shown there is provided a displacement equal to 2*a*, i.e. twice the width of the inserts 30*a*.

There may also be given a magnetic alternating flux through the cross-paths. In this case the cross-paths are provided with coils through which the alternating signal is propagated. For this purpose one may also use the pulses of switching in and off of the magnetic flux. If rectifier arrangements are employed in the coil circuit, one may also selectively use the switching-on or the switching-off pulse.

Of course one may also hold fast the lever 31 of FIG. 17 according to the arrangement of the first of the abovementioned embodiments. In this case this arrangement may suitably replace a relay. In connections employing a plurality of relays the use of this arrangement is especially economic for junction transmission in substation exchange switchboards.

Figure 21:
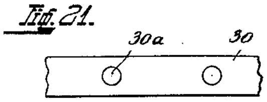
FIG. 21 shows an embodiment with rails, wherein cylindric parts are provided as magnetic inserts.
Figure 22:
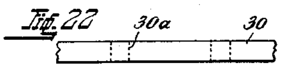
FIG. 22 is a plan view of this arrangement.

FIGURES 21 and 22 show an especially advantageous embodiment of the magnetically conductive parts in the rails according to the principle of FIG. 17. The rails 30 of nonmagnetic material are provided with holes, in which the cylindric parts 30*a* of magnetic material are inserted. These cylindric parts may also be cast in an artificial material.

By using purely mechanical separate switches the arrangement becomes particularly simple. Switches of this type are used in ball point pens. Ball point pens are known in which thhe working position, i.e. the writing position, is obtained by pushing the pin, while the starting position is reestablished by pushing it another time. The same effect may be obtained with a magnet position of the present invention. In this case the pusher is a relay armature which actuates contact springs by the intermediate of a bent lever.

The arrangement is not only designed for selective attraction of armatures but may be applied to the most varied fields, where only magnetic fluxes are required, as for deviating electron rays.

What I claim is.

1. An arrangement for setting magnetic circuits comprising a cam shaft having a plurality of cam pins thereon, a rail having a plurality of bent levers pivotally mounted with respect thereto, magnetic means on said rail for generating a magnetic field so that upon movement of said cam shaft said bent levers will successively be actuated with successive movement of said cam pins adjacent said bent levers to complete a magnetic flux path from said cam shaft through said cam pins through said bent levers and into said rail.

2. An arrangement according to claim 1, wherein said cam pins are arranged in radially and longitudinally spaced relationship on said cam shaft.

3. An arrangement for setting magnetic circuits comprising a cam shaft having a plurality of cam pins thereon, a rail having a plurality of pivotally mounted bent levers disposed between said cam shaft and said rail, first magnetic means on said rail for generating a magnetic field so that upon movement of said cam shaft said bent levers will successively be actuated with successive movement of said cam pins adjacent said bent levers to complete successive magnetic flux paths from said cam shaft through said cam pins through said bent levers and into said rail, locking means supported by said bent levers and falling into locking engagement holding said bent levers out of an initial position when said bent levers are actuated, second magnetic means for raising said pins, and spring means for restoring said bent levers to their initial position.

4. An arrangement for setting magnetic circuits comprising a cam shaft having a plurality of radially and longitudinally spaced cam pins thereon, a first rail provided with a plurality of projections, a second rail carrying a plurality of pins, a plurality of bent levers pivotally mounted and disposed between said cam shaft and said first rail and engageable by said pins to hold said pins in a raised position, said cam pins actuating said bent levers to pivot said bent levers to permit said pins to fall into engagement with said projections thereby blocking said bent levers, magnetic field generating means on said first rail for exciting said bent levers to move said bent levers toward said cam pins when said cam pins are adjacent said bent levers, and magnetic coil means on said second rail for raising said pins out of blocking position with respect to said bent levers.

5. An arrangement for setting magnetic circuits comprising a cam shaft having a plurality of radially and longitudinally spaced cam pins thereon, a first rail provided with a plurality of projections, a second rail carrying a plurality of pins, a plurality of bent levers pivotally mounted and disposed between said cam shaft and said first rail and engageable by said pins holding said pins in a raised position, first magnetic means on said rail for generating a magnetic field so that upon movement of said cam shaft said bent levers will successively be actuated with successive movement of said cam pins adjacent said bent levers to complete successive magnetic flux paths from said cam shaft through said cam pins, through said bent levers, and into said rail while allowing said pins to fall into contact with said projections holding said bent levers out of their initial position, second magnetic means on said second rail for raising said pins, and spring means connected to said bent levers for restoring said bent levers to their initial position.

References Cited in the file of this patent

UNITED STATES PATENTS

| | | |
|---|---|---|
| 1,873,729 | Wheelock | Aug. 23, 1932 |
| 2,770,796 | Boer | Nov. 13, 1956 |